(12) United States Patent
Arvin et al.

(10) Patent No.: US 7,110,005 B2
(45) Date of Patent: Sep. 19, 2006

(54) OBJECT MANIPULATORS AND FUNCTIONALITY

(75) Inventors: Scott Anthony Arvin, New Boston, NH (US); Marc W. Schindewolf, Hopkinton, NH (US); Rostislaw Starodub, Munich (DE); Paul Joseph Mcardle, Bow, NH (US); Mandar Shashikant Garge, Nashua, NH (US)

(73) Assignee: Autodesk, Inc., San Rafael, CA (US)

( * ) Notice: Subject to any disclaimer, the term of this patent is extended or adjusted under 35 U.S.C. 154(b) by 109 days.

(21) Appl. No.: 10/657,422

(22) Filed: Sep. 8, 2003

(65) Prior Publication Data

US 2004/0046769 A1 Mar. 11, 2004

Related U.S. Application Data

(60) Provisional application No. 60/408,710, filed on Sep. 6, 2002.

(51) Int. Cl.
*G09G 5/00* (2006.01)
*G06F 3/00* (2006.01)
(52) U.S. Cl. ...................... 345/619; 715/769
(58) Field of Classification Search ........ 345/619–624, 345/157, 163; 715/798–801, 765, 768, 769, 715/856, 840
See application file for complete search history.

(56) References Cited

U.S. PATENT DOCUMENTS

| | | | | |
|---|---|---|---|---|
| 4,701,752 A | * | 10/1987 | Wang | 345/655 |
| 5,299,307 A | * | 3/1994 | Young | 715/861 |
| 5,396,590 A | * | 3/1995 | Kreegar | 715/808 |
| 5,651,107 A | * | 7/1997 | Frank et al. | 715/768 |
| 5,861,889 A | * | 1/1999 | Wallace et al. | 345/619 |
| 5,956,032 A | * | 9/1999 | Argiolas | 715/798 |
| 6,025,849 A | * | 2/2000 | Felser et al. | 345/441 |
| 6,639,606 B1 | * | 10/2003 | Choi | 715/700 |

OTHER PUBLICATIONS

MS Windows User's Guide Ver. 3.X by Microsoft Corporation, Monotyoe Corp. PLC, 1991, pp. 8, 18, 27, 142, 160.*
Livingston & Straub, Windows 95 Secrets 3rd Edition, IDG Books Worldwide, Inc., 1995, pp. 150, 151, 560,614.*

* cited by examiner

*Primary Examiner*—Kee M. Tung
*Assistant Examiner*—Michelle K. Lay
(74) *Attorney, Agent, or Firm*—Gates & Cooper LLP

(57) ABSTRACT

A method, apparatus, and article of manufacture provide the ability to display and use object manipulators in a computer graphics program. In some embodiments, an object manipulator (i.e., a button object manipulator or traditional object manipulator) is displayed on a graphics object and activated. In response to the activation, a property of the graphics object is directly modified. Various forms and properties of the object manipulator provide additional capabilities that may assist the user in the graphics program.

42 Claims, 13 Drawing Sheets

FIG. 6A
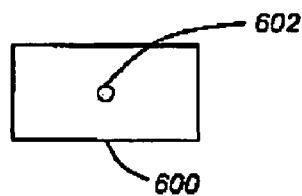
FIG. 6B
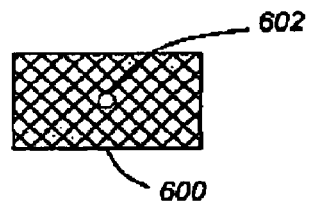
FIG. 7
| Shape | Name | Description |
|---|---|---|
| ◆ | Diamond | Alignment to a line. e.g. ———◇——— |
| ⊙ | Circle | Miscellaneous. |
| ✚ | Plus | Increment a value.<br>Attach one object to another. |
| ⊟ | Minus | Decrement a value.<br>Detach one object from another. |
| ⇧ | Arrow | Change direction. |
| ⊙ | Command (Small Circle) | Execute a miscellaneous command. 3/4 the size of a normal Circle grip so it is unobtrusive. |

FIG. 8A
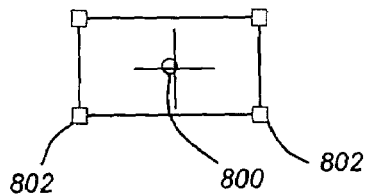
FIG. 8B
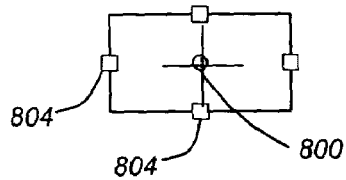
FIG. 9A
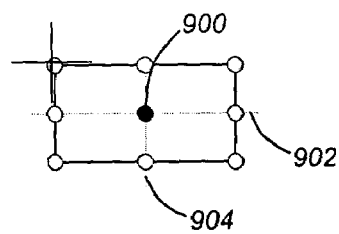
FIG. 9B
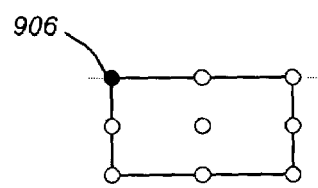
FIG. 10
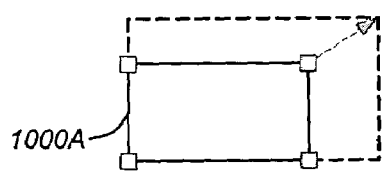
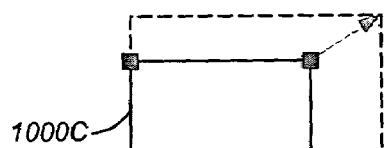
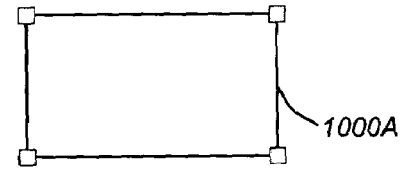
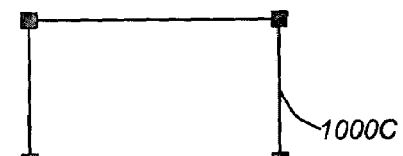

FIG. 11

| Color | Name | Description |
|---|---|---|
| | Object | Use to indicate that the value being edited by the grip will only affect the selected object. |
| | Object Light | Use for grips not in a horizontal plane, to help differentiate them from the usually more numerous horizontally oriented grips. |
| | Object Dark | Also used for Free Form Mass Element Face grip, for faces pointing away from the viewport. |
| | Secondary Object | Use to identify a set of grips on one object that is related to another object being edited. For example, if the anchor of a door in a wall is being edited, the door's grips use the Object grip color, and the grips aligned with the wall use the Secondary Object grip color. |
| | Style | Use to indicate that the value being edited by the grip is a style value, and will affect all objects with the same style as the selected object. |
| | Auxiliary | Use for miscellaneous grips that do not immediately change an object's properties. Examples: changing edit state or changing the current shape being edited. |
| | Auxiliary Dark | Use for Free Form Mass Element Edit Face grip, for faces pointing away from the viewport. |
| | Hover | The color of a grip when the user has snapped to it, but hasn't selected it. Used to provide feedback to the user when there are many grips in a small area. |
| | Selected | The color of a grip once it has been selected. |

OBJECT MANIPULATORS AND FUNCTIONALITY

CROSS-REFERENCE TO RELATED APPLICATIONS

This application claims the benefit under 35 U.S.C. Section 119(e) of the following and commonly-assigned U.S. provisional patent application(s), which is/are incorporated by reference herein:

U.S. Provisional Patent Application Ser. No. 60/408,710, entitled "DISPLAY AND USE OF OBJECT MANIPULATORS", by Scott Anthony Arvin, Marc W. Schindewolf, Rostislaw Starodub, Dianne Smith Phillips, Mandar Shashikant Garge, Paul Joseph McArdle, and John G. Ford III, filed on Sep. 6, 2002.

This application is related to the following co-pending and commonly-assigned patent application, which application is incorporated by reference herein:

U.S. patent application Ser. No. 10/657,427, entitled "TEMPORARY TEXT AND GRAPHIC FEEDBACK FOR OBJECT MANIPULATORS", by Scott Anthony Arvin, filed on the same date herewith,

BACKGROUND OF THE INVENTION

1. Field of the Invention

The present invention relates generally to computer graphics programs, and in particular, to a method, apparatus, and article of manufacture for using object manipulators in a computer graphics program.

2. Description of the Related Art

The use of graphics programs such as Computer Aided Design (CAD) application programs is well known in the art. CAD drawings often have many components (referred to as objects or graphics objects) that together define the drawing. In most computer applications that create and modify graphic objects, an object manipulator is a standard mechanism used to modify the geometric properties of the graphic object. However, the nature and use of object manipulators in the prior art is limited to that of modifying an object's geometric properties. Such limitations are undesirable and reduce the flexibility and usability of computer graphics applications. These problems may be better understood by describing prior art drawing programs, object properties, object manipulators, and property modification techniques.

Drawing Programs

CAD applications are often used to create drawings used in the architectural, engineering, and construction (AEC) industry. The drawings are often defined by a collection of one or more graphical elements (referred to as objects), such as lines, circles, polylines, text, or dimensions. For example, a collection of various lines may make up a door or window object. CAD programs may treat each object as a single element for creation, manipulation, and modification. Some CAD programs may also provide objects that are special entities with predefined behaviors and display characteristics. Thus, the objects in a CAD program may be object-oriented objects having various methods/behaviors and properties (including display characteristics).

Information relating to an object may be entered and defined in one or more properties of the object. For example, users may have the capability to enter information about the style, dimensions, location, schedule data, display information and/or other important characteristics of an object.

Object Properties

To edit and maintain an object and/or properties of the object, various methodologies may be available. For example, a properties window may provide a common "one stop" location where a user can manage object properties without having to use individual typed commands. Such a properties window may list the current settings for all object properties, and allow the properties to be viewed alphabetically or by category. To change a property, the property may be selected from the list and a new value may be selected or entered.

Object Manipulators

As described above, an object manipulator is a prior art mechanism used to modify the geometric properties of a graphic object. Other names for object manipulators are handles, or grips. An object manipulator is typically implemented as a glyph or symbol, such as a small square, displayed at some geometrically meaningful point on the object to be manipulated.

FIG. 1 illustrates a prior art rectangle 100 that is selected for modification, with object manipulators 102 displayed as filled squares located at each vertex. Activating and dragging one of the object manipulators 102 modifies the position of the vertex, and thus the width and height properties of the rectangle.

The typical way to interact with an object manipulator 102 is to place an identifier (e.g., a cursor) controlled by a pointing device (e.g., a computer mouse) over the manipulator 102, activating the manipulator 102 by clicking a physical button on the pointing device, dragging the pointing device to change the position of the manipulator 102, and finally clicking the pointing device again to set the desired value of the object feature being manipulated. However, in the prior art, object manipulators 102 may only be used to alter the geometric properties (e.g., vertex position, shape, etc.) of an object by dragging the manipulator.

Buttons

To adjust object properties other than geometric properties, the prior art may rely on the use of buttons. As illustrated in FIG. 2, in standard computer user interfaces, a button 200 is a common control used to initiate an action to modify some aspect of the state of the interface. The button 200 displays text (e.g., "SAVE") or icon graphics to provide information to the user as to the results of activating the button 200. The typical way to interact with a button 200 is to place an identifier (e.g., a cursor) controlled by a pointing device (e.g., a computer mouse) over the button 200, and activating the button 200 by clicking a physical button on the pointing device. Once activated, an action is performed or the state of the interface is modified.

Accordingly, what is needed is the capability to edit an object's properties (geometric and otherwise) in an intuitive, easy, and understandable manner.

SUMMARY OF THE INVENTION

One or more embodiments of the invention provide a method, apparatus, and article of manufacture for modifying a property of an object using object manipulators. The object manipulators may take various forms, glyphs/shapes, and colors to facilitate ease of use and understanding by the user. Additionally, various additional graphic images may be displayed to assist the user in accomplishing a desired task. Further, a property of an object may be constrained in a variety of manners. Such constraints may be reflected in/by object manipulators and/or the use of object manipulators.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Referring now to the drawings in which like reference numbers represent corresponding parts throughout:

FIGS. 6A and 6B illustrate the use of a button object manipulator/trigger grip in accordance with one or more embodiments of the invention;

FIG. 7 illustrates an example of some of the shapes, names, and descriptions that may be possible for a trigger grip in accordance with one or more embodiments of the invention;

FIGS. 8A and 8B illustrate the use and display of object manipulator sets in accordance with one or more embodiments of the invention;

FIGS. 9A and 9B illustrate the use of object manipulators to align a graphic object in accordance with one or more embodiments of the invention;

FIG. 10 illustrates the use of object manipulators when multiple objects share the same properties in accordance with one or more embodiments of the invention;

FIG. 11 illustrates examples of the different types of colors, names, and descriptions of the meaning of the different colors that may be used in accordance with one or more embodiments of the invention;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
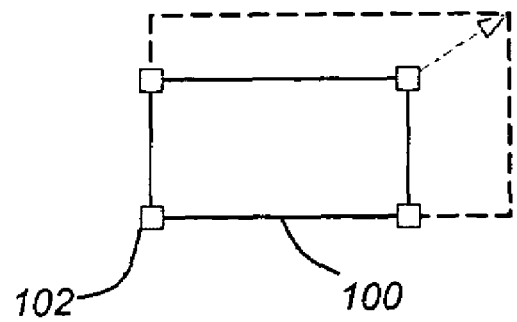
FIG. 1 illustrates a prior art rectangle that is selected for modification, with object manipulators displayed as filled squares located at each vertex.
Figure 2:
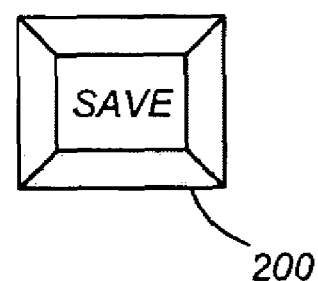
FIG. 2 illustrates a prior art button.
Figure 3:
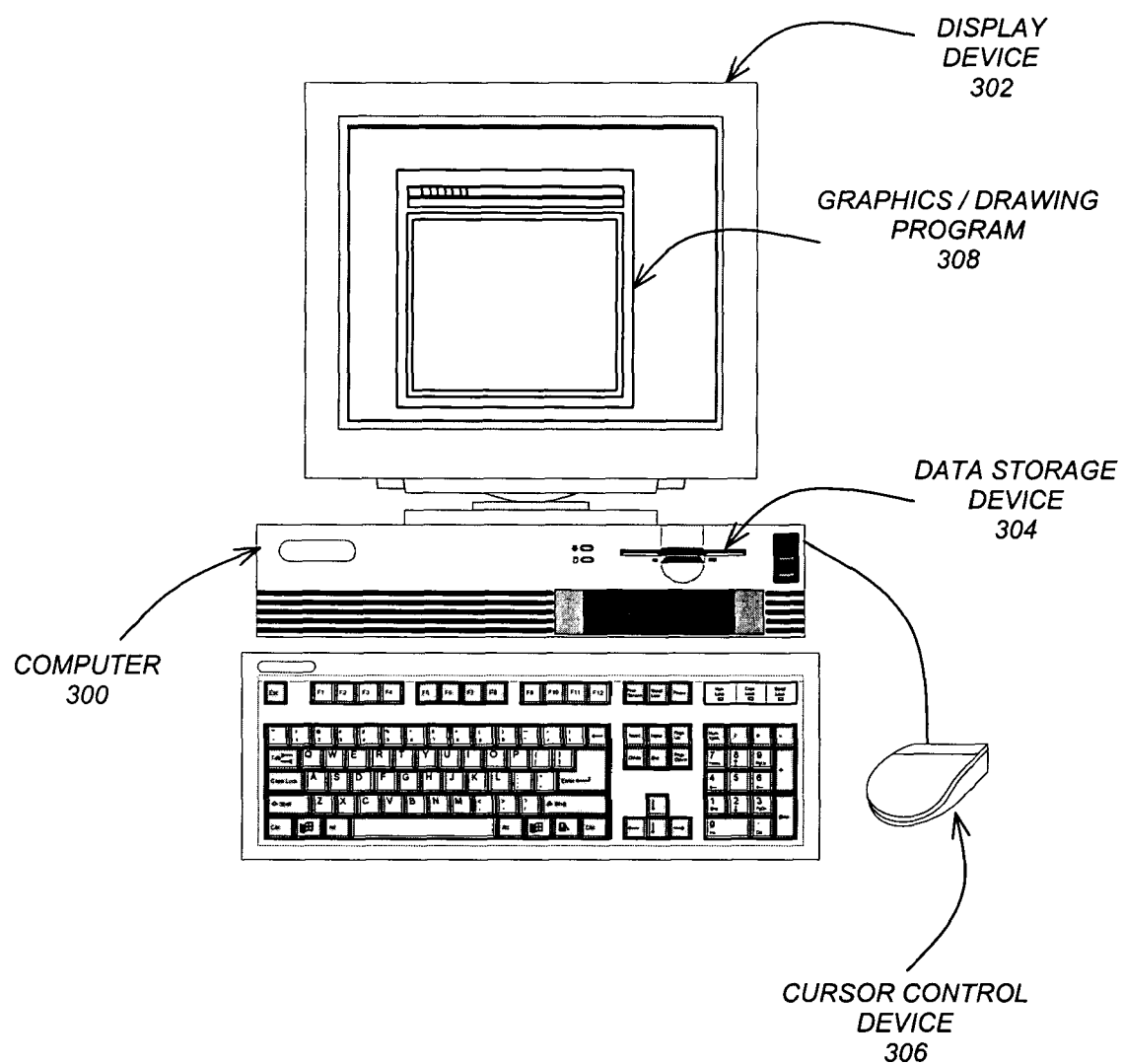
FIG. 3 is an exemplary hardware environment used to implement one or more embodiments of the invention.

FIG. 3 is an exemplary hardware environment used to implement one or more embodiments of the invention. Embodiments of the invention are typically implemented using a computer 300, which generally includes a display device 302, data storage devices 304, cursor control devices 306, and other devices. Those skilled in the art will recognize that any combination of the above components, or any number of different components, peripherals, and other devices, may be used with the computer 300.

One or more embodiments of the invention are implemented by a computer-implemented graphics program 308 (e.g., a computer-aided design [CAD] program), wherein the graphics program 308 is represented by a window displayed on the display device 302. Generally, the graphics program 308 comprises logic and/or data embodied in or readable from a device, media, carrier, or signal, e.g., one or more fixed and/or removable data storage devices 304 connected directly or indirectly to the computer 300, one or more remote devices coupled to the computer 300 via a data communications device, etc.

Those skilled in the art will recognize that the exemplary environment illustrated in FIG. 3 is not intended to limit the present invention. Indeed, those skilled in the art will recognize that other alternative environments may be used without departing from the scope of the present invention.

Software Embodiments

Figure 4:
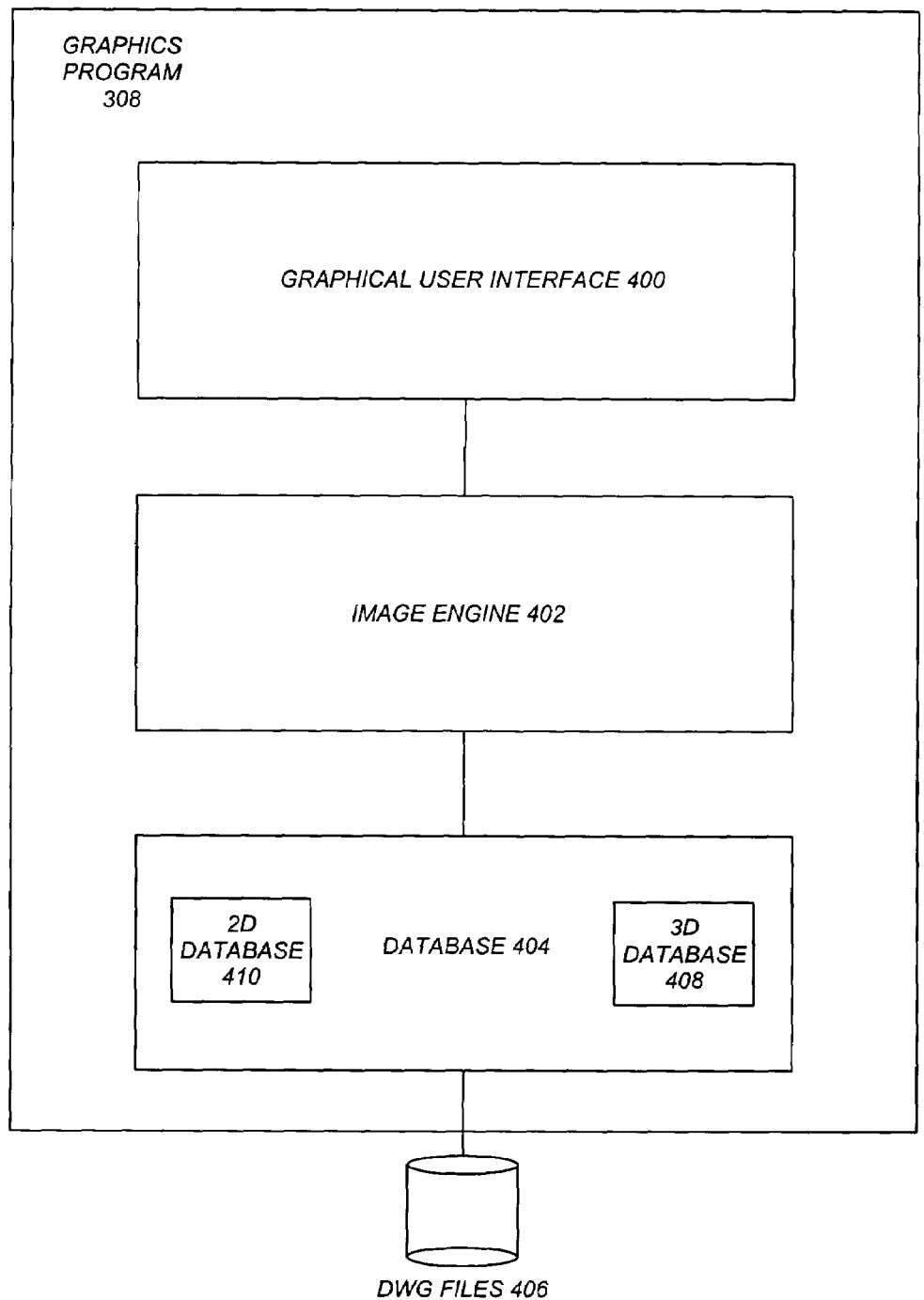
FIG. 4 is a block diagram that illustrates the components of a graphics program in accordance with one or more embodiments of the invention.

FIG. 4 is a block diagram that illustrates the components of the graphics program 308 in accordance with one or more embodiments of the invention. There are three main components to the graphics program 308, including: a Graphical User Interface (GUI) 400, an Image Engine (IME) 402, and a DataBase (DB) 404 for storing objects in Drawing (DWG) files 406.

The Graphical User Interface 400 displays information to the operator and provides the functionality for the operator's interaction with the graphics program 308.

The Image Engine 402 processes the DWG files 406 and delivers the resulting graphics to the monitor 302 for display. In one or more embodiments, the Image Engine 402 provides a complete application programming interface (API) that allows other computer programs to interface to the graphics program 308 as needed.

The Database 404 is comprised of two separate types of databases: (1) a 3D database 408 known as the "3D world space" that stores 3D information; and (2) one or more 2D databases 410 known as the "2D view ports" that stores 2D information derived from the 3D information.

Object List

Figure 5:
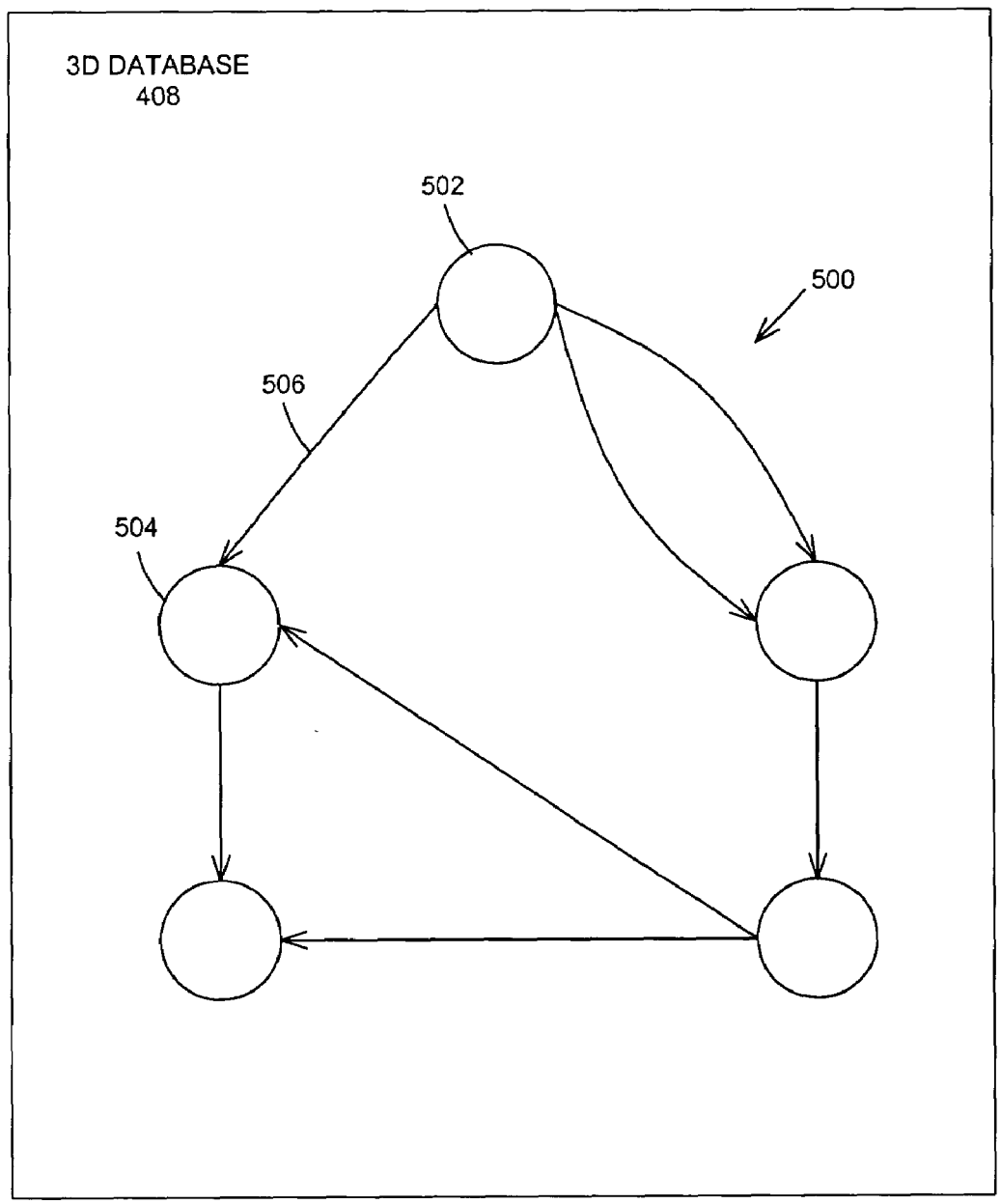
FIG. 5 is a block diagram that illustrates the structure of an object list maintained by a 3D database in accordance with one or more embodiments of the invention.

FIG. 5 is a block diagram that illustrates the structure of an object list 500 maintained by the 3D databases 408 in accordance with one or more embodiments of the invention. The object list 500 is usually comprised of a doubly-linked list having a list head 502 and one or more objects 504 interconnected by edges 506, although other structures may be used as well. There may be any number of different object lists 500 maintained by the 3D databases 408. Moreover, an object 504 may be a member of multiple object lists 500 in the 3D databases 408.

Terminology

As used herein, certain terms may be used frequently. The following provides definitions and descriptions for such terminology. However, the terminology definitions and descriptions provided herein are not intended to limit the scope of the invention and alternative meanings of such terms remain within the scope of the invention.

A "glyph" is a symbol that conveys information nonverbally. A glyph may have the following properties:

Shape—the polygonal shape of the glyph that is drawn.

Color—the color of the shape, both the glyph's outline color and its fill color.

Fill mode—whether or not the polygon is filled with a specified color.

Orientation—the rotational orientation of the glyph shape, generally whether or not the shape is transformed to align with the object being edited.

A "grip" is a glyph that has been positioned on an object and has an active area within which a pointing device will "snap" to the grip's position. The grip indicates that an action can be performed on the object, and defines the behavior of that action. A custom grip may have the following characteristics:

Glyph—the shape that is drawn.

Position—the position on the object where the glyph is located.

Size—the active area of the grip, usually defined in pixels, within which the pointing device will snap to the grip's position.

Parameter(s)—one or more parameters that can change while using the grip.

Behavior—what happens when the user selects the grip and drags the pointing device.

Geometric constraints—cursor position might be constrained along a specified set of points, a line such as a coordinate axis, or a plane.

Dimensional constraints—value being changed might be constrained to a user specified precision, or to a pre-specified list of acceptable values, such as a list of standard door sizes.

Dynamic dimensions—ability to display a temporary dimension when the grip is paused over or selected, and allows direct entry to change dimension value and update object.

Temporary location of the User Coordinate System (UCS), such as when constrained to a plane.

Key modifiers, such as Shift, Ctrl, or Alt key, to optionally change the behavior of a particular grip.

Cool grip—Grips are cool when displayed on an object that is not selected.

Warm grip—A grip is warm when displayed on an object that is selected.

Hot grip—A grip becomes hot when the grip is selected.

The standard unconstrained grip that may appear on graphics objects may have a glyph shape that is identical to the grip area in plan view and the glyph scale may be equal to one (1).

Button Object Manipulators/Trigger Grips

As described above, the prior art relies on object manipulators (e.g., a grip) and or buttons to alter an object or the object's properties. Prior art object manipulators/grips are also referred to as drag grips. To use the drag grip, the user selects the grip, drags the pointing device, selects a new point, and some parameter on the object is updated based on the vector between the original grip position and the selected point.

One or more embodiments of the invention combines the behavior of multiple prior art controls (i.e., the object manipulator control/grip and button control) to create an object manipulator (also referred to as a trigger grip) that is used as a button. Accordingly, the trigger grip is a new type of grip that changes an object (i.e., modifies a property [or state of an associated parameter] of a graphic object) by activating the grip/manipulator without the need for conducting a drag operation (or conducting any additional interaction from/with the user).

The trigger grip immediately performs an action on an object when a user selects it, as opposed to the normal drag grip, which changes a dimension property only when a user drags it. Trigger grips may be used to set discrete properties of an object, such as the swing direction of a door or the justification of a wall. Trigger grips may also be used to change the grip edit mode of an object (i.e., the manner/mode in which a grip may be used to edit an object). For example, selecting an Edit Grid grip in a curtain wall may initiate an in-place editing mode for the curtain wall grid.

The trigger grip may behave in various manners when selected by a user. In one or more embodiments, trigger grips perform some action or change some property immediately upon selection. Accordingly, the user selects the grip, and the object is changed in some way. Further, the grip does not remain selected. For example, FIG. 6A shows a rectangle 600 with an object manipulator/trigger grip 602 located at the rectangle's center. By activating the manipulator 602, the fill property of the rectangle 600 may be modified, resulting in the image shown in FIG. 6B.

Trigger grips make take the form of various shapes. FIG. 7 illustrates an example of some of the shapes, names, and descriptions that may be possible for a trigger grip in accordance with one or more embodiments of the invention.

Using Button Object Manipulators to Change Edit State

In the prior art, multiple grips may be simultaneously displayed. The display of multiple grips simultaneously may be confusing and may crowd the display. Further, if multiple grips are located near each other, the user may have difficulty selecting a particular grip. In one or more embodiment of the invention, a button object manipulator may be used to change the manipulators/grips on the object being manipulated from one set of manipulators to another.

For example, in FIG. 8A, a rectangle has a button manipulator 800 at the rectangle's center and has drag manipulators 802 at each vertex. Activating the button manipulator 800 removes the vertex manipulators 802 and displays a new set of manipulators 804 in the middle of each edge, as shown in FIG. 8B.

Using Button Object Manipulators to Set Potential Discrete Values

As described above, prior art grips were limited to altering geometric properties of an object. However, using the grips to alter the geometric properties could potentially be confusing (e.g., when multiple possible geometric properties are available). Further, prior art grips were not and could not be used to modify discrete values for properties of an object.

In one or more embodiments of the invention, one or more button object manipulators are used to set one or more discrete object property values. This method can be used to display to the user a discrete number of acceptable property values, or to display manipulators in geometrically meaningful locations on the object when the language-based descriptions of the associated properties are potentially geometrically confusing.

For example, a graphics application might have a rectangle with possible horizontal alignment values of Left, Center, and Right, and possible vertical alignment values of Top, Middle, and Bottom. Further, the rectangle might be drawn using those alignment properties relative to its specified location. Thus, the rectangle could be drawn in different positions by changing its alignment but not its location.

FIG. 9A shows a rectangle with a middle-center alignment. The middle-center alignment location is indicated with horizontal line 902 and vertical line 904. The dark circle 900 is the object manipulator used to indicate the rectangle's current alignment; while the eight light circles are the object manipulators used to indicate the rectangle's potential alignments. Referring to FIG. 9B, by activating the top-left manipulator 906 with a pointing device, the user can change both the vertical and horizontal alignment properties as shown. Accordingly, the object manipulators 906 may be activated to adjust the alignment property to a particular discrete value depending on which object manipulator is selected.

Using Object Manipulator Color to Indicate Potential Changes to Other Objects

In prior art computer graphics applications object manipulators may be colored for a variety of reasons. For example, the color of a manipulator may be set to indicate something about the feature being manipulated (e.g. on a solid modeling object, vertex manipulators might be one color, while edge manipulators might be another color). Alternatively, the color of the manipulator may indicate the selection state of the object selected. For example, one object in a selection set containing multiple objects might be one color, while all of the other objects might be another color. Such a coloring of a single object in a set may indicate that the single object is considered the primary selection.

In one or more embodiments of the invention, the color of object manipulators indicates whether or not the object itself, or other, non-selected, objects will be affected by interacting with the object manipulator. For example, light colored manipulators might indicate that only the object being manipulated will be affected by the interaction, while dark colored manipulators might indicate that not only the selected object, but all other objects with similar properties will be affected by the interaction. The different colors may be useful to warn the user that the consequences of using the object manipulator extend beyond the selected object.

FIG. 10 illustrates four rectangles 1000A–1000D, the bottom, shaded rectangles 1000C and 1000D are designated as sharing the same properties, while the top, un-shaded rectangles 1000A and 1000B do not share the same properties. Interacting with a light colored vertex manipulator (i.e., of rectangle 1000A) results in only the selected object 1000A being modified (and not object 1000B). However, interacting with a dark colored vertex manipulator (i.e., of rectangle 1000C) may result in more than the selected object 1000C being modified (i.e., both rectangle 1000C and 1000D are modified).

In addition, using a color to indicate that only a property of the object itself will be changed is useful when using a button object manipulator to change the editing state of the object.

FIG. 11 illustrates examples of the different types of colors, names, and descriptions of the meaning of the different colors that may be used in accordance with one or more embodiments of the invention. As illustrated the Object color may be used to indicate that the value being edited by the grip will only affect the selected object. The Object Light color may be used for grips not in a horizontal plane, to help differentiate them from the usually more numerous horizontally oriented grips. The Object Dark color may be used for a particular type of grip (e.g., a Free From Mass Element Face Grip available in Architectural Desktop™ available from the assignee of the present invention) and/or for faces pointing away from a viewport.

The Secondary Object color may be used to identify a set of grips on one object that is related to another object being edited. For example, if the anchor of a door in a wall is being edited, the door's grips use the Object grip color, and the grips aligned with the wall use the Secondary Object grip color.

The Style color may be used to indicate that the value being edited by the grip is a style value, and will affect all objects with the same style as the selected object.

The Auxiliary color may be used for miscellaneous grips that do not immediately change an object's properties. For example, the auxiliary color may be used for changing the edit state of a grip or changing the current shape being edited. The Auxiliary Dark color may be used for Free Form Mass Element Edit Face grips, for faces pointing away from the viewport.

The Hover color may indicate when the user has snapped to the grip, but hasn't selected the grip. Thus, the hover color may be used to provide feedback to the user when there are many grips in a small area.

Lastly, the Selected color may indicate that the grip has been selected.

View Dependent Visibility of Oriented Object Manipulators

In some prior art graphic applications that create and modify three-dimensional objects, the object manipulators may be oriented so as to align with the object, making it easier to understand what property the manipulator will modify and how the property/object will behave.

Figure 12A:
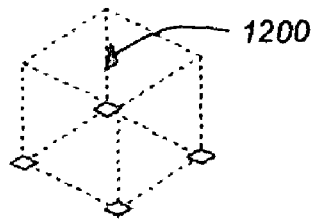
FIGS. 12A–12D illustrate the reorientation and display of object manipulators in accordance with one or more embodiments of the invention.
Figure 12B:
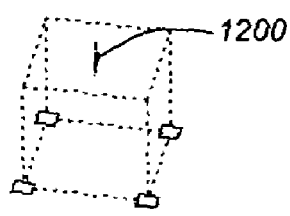

In one or more embodiments of the invention, object manipulators oriented to the object being manipulated may be reoriented or not visible in certain viewing directions where the orientation of the manipulator might be visually confusing or indistinct. For example, FIG. 12A shows a three-dimensional view of a box, with a triangular object manipulator 1200 to modify the box's height. FIG. 12B shows the same box viewed from a different direction, where the height manipulator 1200 is difficult to see and interact with.

Figure 12C:
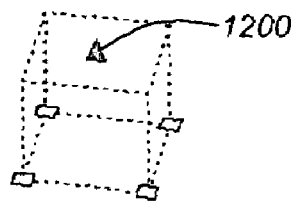

FIG. 12C shows the same box viewed from the same direction as used in FIG. 12B, where the height manipulator 1200 has been reoriented to still align with the object being manipulated, but is now easier to see and manipulate.

Figure 12D:
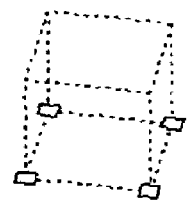

FIG. 12D shows the same box viewed from the same direction as used in FIG. 12B, where the height manipulator 1200 is not visible. Accordingly, the visibility of an oriented object manipulator 1200 may be dependent on the displayed view. The capability to prevent the display of an object manipulator that is difficult to see and interact with may have various advantages. For example, such a capability could be used on an object with a large number of manipulators so that the number of displayed manipulators is reduced to avoid confusion.

Modifying Object Manipulator Function with Discrete Key Presses

In the prior art, an object manipulator may have only one function. Further, in some applications, holding down a control key such as the Shift key modifies or constrains the cursor point relative to the manipulator, such as constraining cursor movement from the manipulator horizontally or vertically. Another prior art approach is to change the set of manipulators on an object by repeatedly clicking on the object with the pointing device, where each click cycles through a small set of manipulators. However, the prior art fails to provide the ability for a single manipulator to have multiple functions and the ability to easily step through or select the desired function of the single particular manipulator.

In one or more embodiments of the invention, some object grips have multiple functions. For example, a face grip on a freeform mass element may have the following possible grip modes:

Move ortho
Move
Move plane
Pull ortho
Pull
Push ortho

The function of an object manipulator may be modified after it has been activated when a control key, such as the Ctrl key, is pressed and released (e.g., and not simply held down). Further, an object manipulator may have a default function/action associated with it that may be invoked when the manipulator is activated with/without using the control key. Once activated (or with the first selection of the manipulator), the control key may be used to cycle to the next editing mode. The control key may only need to be activated/depressed once, and then released. Such activation cycles the grip to the next editing mode. After releasing the control key, the user may start editing the grip/object. An alternate key, such as pressing the control and shift keys simultaneously, may cycle the grip to the previous editing mode. In this regard, there is no need to continue pressing the control key while editing the grip.

Figure 13A:
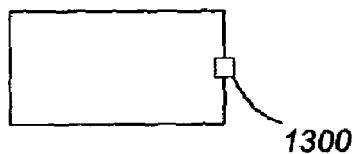
FIGS. 13A–13D illustrate the modification of the manipulator function with discrete key presses in accordance with one or more embodiments of the invention.
Figure 13B:
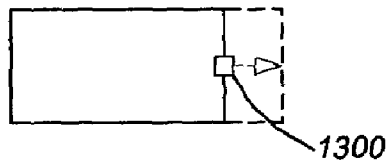
Figure 13C:
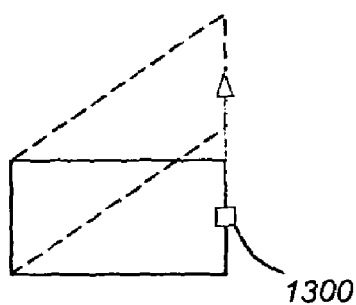
Figure 13D:
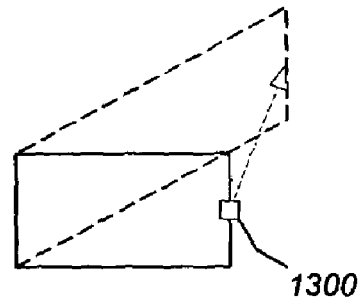

FIGS. 13A–13D illustrate the modification of the manipulator function with discrete key presses in accordance with one or more embodiments of the invention. In FIG. 13A, a manipulator 1300 located on the edge of a rectangle might be used to change the width of the rectangle immediately after it has been activated. After pressing and releasing the identified control key (e.g., the Ctrl key), the same manipulator 1300 might then be used to skew the rectangle, as shown in FIG. 13B. After an additional press and release of the control key, the same manipulator 1300 might then be used to stretch and skew the rectangle at the same time, as shown in FIG. 13C. Continual presses eventually cycle through all (or a subset of) the available manipulator 1300 functions.

One potential advantage of such capability is that multiple functions can be assigned to one manipulator 1300, thereby reducing the number of individual manipulators 1300 displayed on the object and thereby reducing visual complexity.

Cursor Graphics to Display Object Manipulator Function State

In the prior art, the function associated with a particular object manipulator may be unknown. For example, without actually activating and experimenting with an object manipulator, the user may not know what function will be performed by activating the manipulator.

In one or more embodiments of the invention, a graphic image may be displayed near the cursor of the pointing device to graphically indicate the manipulator's current function state. Accordingly, if a single object manipulator has multiple functions, which the user is able to cycle through, the user can easily visually identify the manipulator's current function state.

Figure 14A:
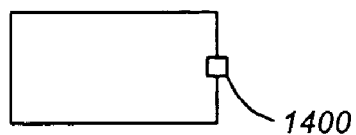
FIGS. 14A–14D illustrate the graphic display of object manipulator function state in accordance with one or more embodiments of the invention.
Figure 14B:
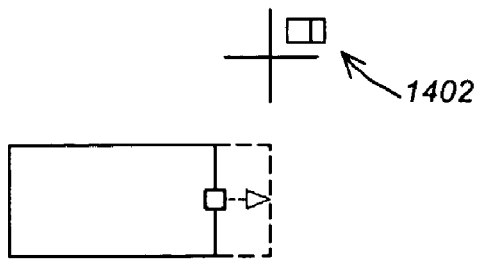
Figure 14C:
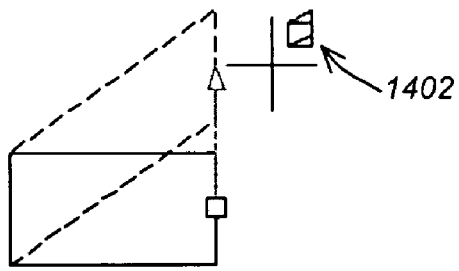
Figure 14D:
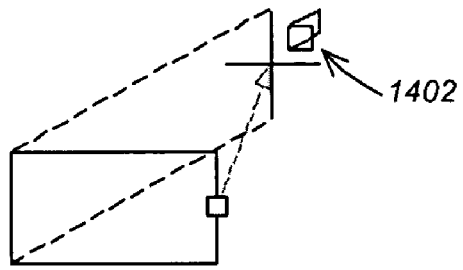

For example, referring to FIG. 14A, a manipulator 1400 located on the edge of a rectangle may be used to change the width of the rectangle as one function. A graphic image 1402 indicating such functionality may be displayed near the cursor as illustrated in FIG. 14B. If the function of the same manipulator 1400 was changed in some way to be used to skew the rectangle, a different graphic image 1402 may be displayed, as shown in FIGS. 14C and 14D.

Such a display of functionality may provide various advantages. For example, by displaying the graphic image, the user may be made aware that different functionality exists for the manipulator. Further, the graphic image may provide some indication of what the current functionality is.

Graphic Display of Object Manipulator Constraints

When a grip is selected and dragged, the grip's final position may not be the same as the current cursor position, which might be constrained in some way. Accordingly, each grip may have a constraint defined for it, so that user input is constrained to valid values. One of the challenges with using a two-dimensional pointing device in a three-dimensional graphic application is indicating on a two-dimensional viewing screen where the user's current location is in three-dimensional space. Often the user must visually determine where the current position of the pointing device is in relation to the three-dimensional model the user is working in. This problem is exacerbated when the movement of the pointing device is projected in some way.

Accordingly, in one or more embodiments of the invention, graphic feedback may be provided to indicate where the current cursor position is located in three-dimensional space and how the current cursor position is constrained. To indicate a position of a cursor and how user input is constrained, a line or arc (e.g., a dotted line or arc) may be drawn from the current cursor position to a constrained point. Such a line or arc may be referred to as a projection. Further, when interaction with an object manipulator is constrained is some way, and the current position of a pointing device in three-dimensional space is projected in some way to a point other than the current point, graphics may be drawn between the current point and the resulting point to indicate the progress of that projection.

Figure 15A:
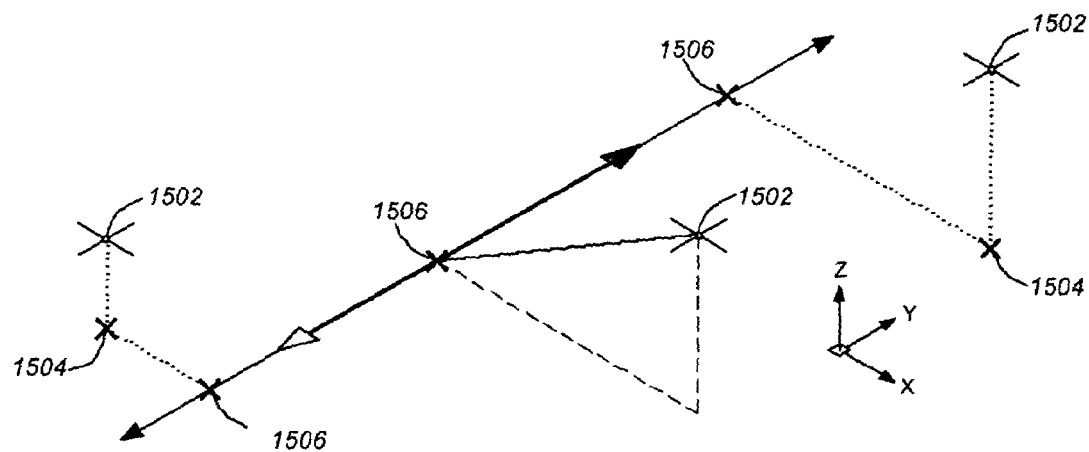
FIGS. 15A and 15B illustrate the graphic display of a constrain to line grip constraint (FIG. 15A) and a constrain to circle grip constraint (FIG. 15B) in accordance with one or more embodiments of the invention.
Figure 15B:
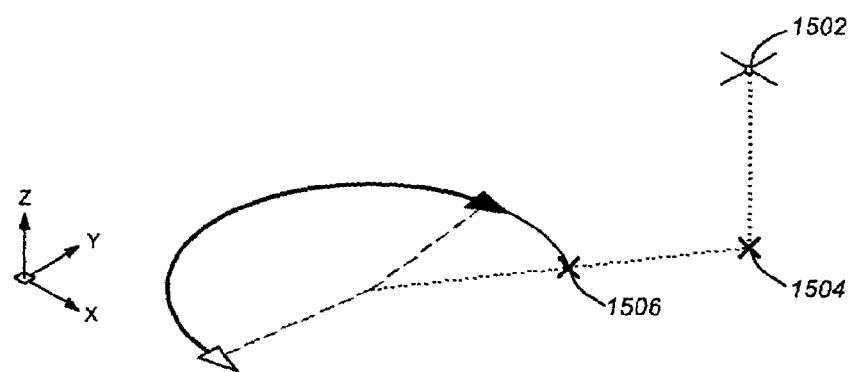

Various general constraint types may be used by a grip and may typically work in three-dimensional as well as two-dimensional space. For example, a constrain-to-plane grip constraint may project user input to a point (e.g., the nearest point) on a specified plane. In this regard, if a constraint has a plane defined for it, a point not on the plane may first be constrained to the nearest point on the plane, then constrained to some other point or specific geometry depending on the rules of the individual constraint. FIGS. 15A and 15B illustrate the graphic display of a constrain-to-line grip constraint (FIG. 15A) and a constrain-to-circle grip constraint (FIG. 15B).

Referring to FIG. 15A, a constrain-to-line grip constraint may project user input from the cursor position 1502 to a point 1506 (e.g., the nearest point) on a specified infinite line. If a plane normal is specified along with the line, user input may first be projected from the cursor position 1502 to a point 1504 on the plane (i.e., the nearest point 1504 on the plane), and may then be projected to a point 1506 on the line (i.e., the nearest point on the line).

Referring to FIG. 15B, a constrain-to-circle grip constraint may project user input from a cursor position 1502 to a point 1506 (e.g., the nearest point) on a specified circle. If a plane is specified, the cursor position 1502 is first projected to a point 1504 on the plane of the circle, and then to a point 1506 on the circle.

Another example of a type of constraint is a constrain-to-line-ray grip constraint which may project user input perpendicularly to a point on a specified line ray. Similar to the line grip constraint, if a plane normal is specified along with the line ray, user input may first be projected to the plane, and then to the line ray. A constrain-to-radial-ray grip constraint may project user input radially to a point on a specified line ray on a specified plane. In this regard, the point be first be projected to the nearest point on the plane, and then projected to a point on the line ray with the same distance to the ray base point as the point on the plane.

A constrain-to-line-segment grip constraint may project user input to a point on a specified line segment. However, if the nearest point is not on the line segment, the point may be constrained to the nearest end point.

Another type of constraint is a constrain-to-polyline grip constraint that may project user input to a point (e.g., the nearest point) on a polyline.

Constraining Object Manipulator Movement to Discrete Dimensional Values

As described above, various types of constraints may be available. In this regard, an object manipulator that is used to set a dimensional property on an object can be positioned at any point on a plane or in three-dimensional space.

In one or more embodiments of the invention, the user may have the capability to constrain grip movement to discrete dimensional values. For example, the movement of a grip may be constrained to a pre-specified set of values.

Figure 16:
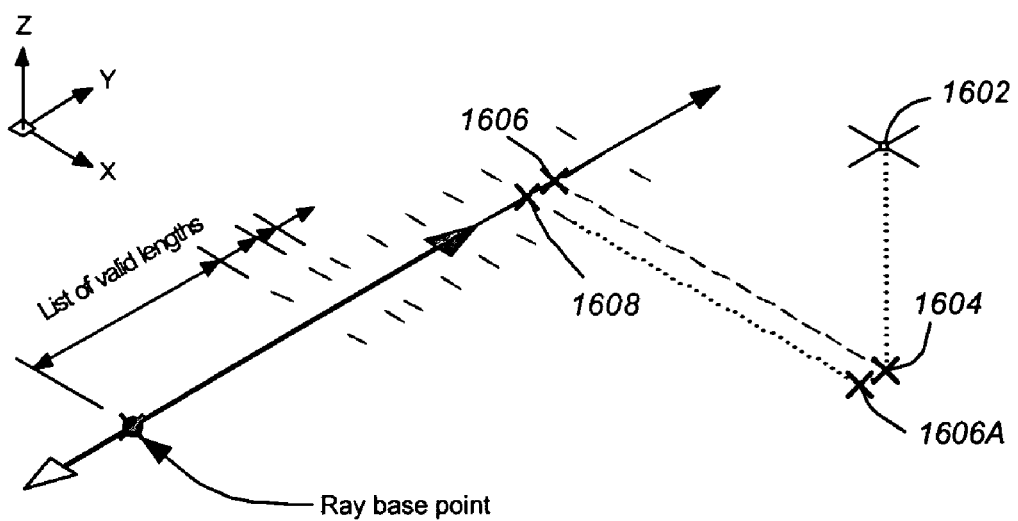
FIG. 16 illustrates a constrain to line ray by values where movement is constrained to a list of valid lengths in accordance with one or more embodiments of the invention.

FIG. 16 illustrates a constrain-to-line-ray-by-values constraint where movement is constrained to a list of valid lengths. As illustrated, the constrain-to-line-ray-by-values grip constraint may project user input from a cursor position 1602 to a point on a specified line ray 1606 and then constrains that point 1606 to the nearest length 1608 from a specified list of valid lengths. If a plane normal is specified along with the line ray, user input may first be projected from the cursor position 1602 to the plane 1604, then to a point 1606 on the line ray, then to the nearest valid value 1608. Thus, the current cursor position 1602 may be projected to the nearest point on the plane 1604, then the nearest point 1606 on the line, then projected to the nearest valid value 1608. As illustrated, to aid in visibility to the user, constraint projection lines may be drawn between points 1602, 1604, 1606A, and 1608—and not point 1606.

A constrain-to-line-segment-by-values grip constraint is basically a combination of constrain-to-line-ray-by-values constraint and constrain-to-line-segment grip constraint. Typically, a grip with a "by values" constraint may also provide the user with a means to enter custom values, such as by holding the Ctrl key while dragging. The "by values" part of a constrain-to-line-segment-by-values constraint acts like a constrain-to-line-ray-by-values constraint, in that the valid values may be measured from a single base point. The "custom" part of the constraint acts like a constrain-to-line-segment constraint.

Cursor Graphics to Indicate Constraint Errors

While graphics may illustrate the various projections for the various types of constraints, the invention may also provide for displaying a bitmap image at the current cursor position if selecting that position will result in an error condition when interacting with an activated object manipulator.

Figure 17:
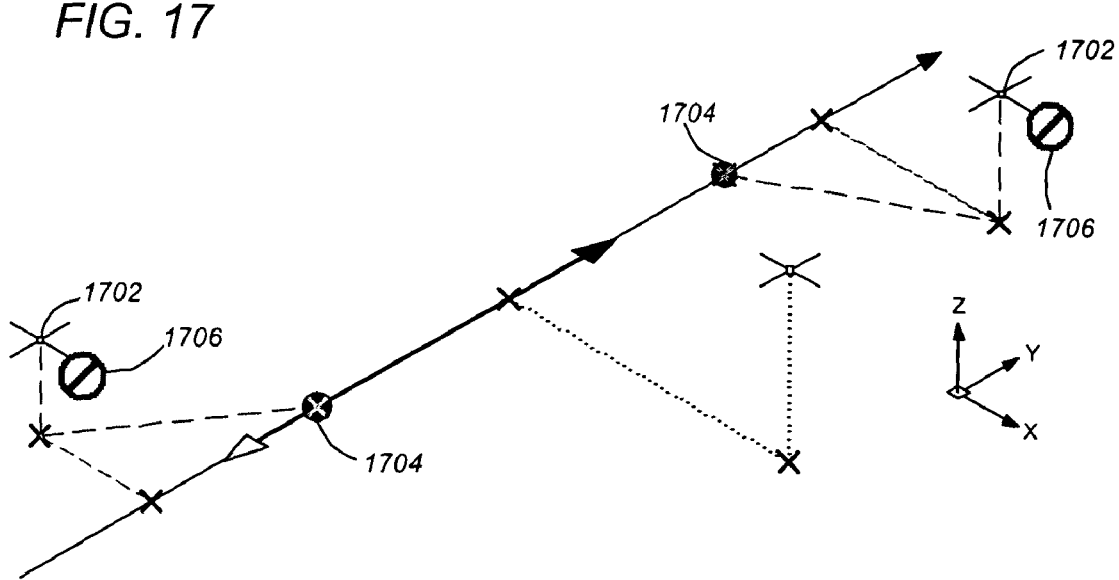
FIG. 17 illustrates the display of an error bitmap image in accordance with one or more embodiments of the invention.

For example, in FIG. 17 cursor 1702 movement is constrained to a specified line segment whose endpoints 1704 are indicated with the black dots. If the current cursor 1702 position projects to an invalid point 1704, a bitmap image 1706 is displayed at the cursor 1702, as shown at the cursor positions 1702 at the far left and far right.

In addition to the above, when a constraint has a valid range (e.g., as a line ray or line segment constraint), if the normal constrain results in the constrained point being located beyond the valid range, the linetype for the normal projection graphics may change to a red dashed line.

Object Manipulator Glyph to Indicate Alignment

Figure 18A:
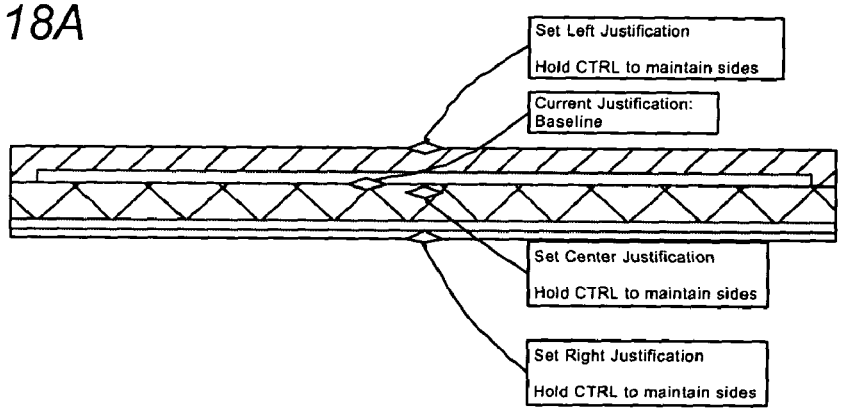
FIGS. 18A and 18B illustrate the use of a particular glyph shape as an object manipulator to align an object in accordance with one or more embodiments of the invention.

Object manipulators may be located at geometric points on the object to be manipulated. In accordance with one or more embodiments of the invention, the shape of the object manipulator is used to indicate the desired alignment. For example, FIG. 18A illustrates the use of a diamond shape as an object manipulator. The various positions of the diamond indicate alignment with a line, circle, or other shape. The diamond shaped object manipulator can be located at any point along the line or circle and still provide the same function. As illustrated, the diamond is oriented horizontally and may indicate left, center, or right justifications. Alternatively, when placed on a line, the diamond may indicate justification with the line where the diamond is located (e.g., the baseline of FIG. 18A).

Figure 18B:
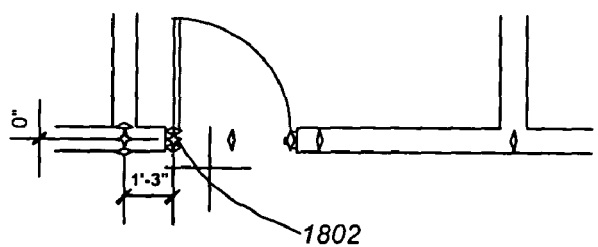

Referring to FIG. 18B, in a case where alignment along two different axes is required, a cross shaped manipulator 1802 may be used to indicate double alignment, in other words a point. Thus, the shape/glyph of the grip may change to indicate the alignment.

Translucent Object Manipulators

In the prior art, object manipulators/grips are opaque, which results in parts of the object being manipulated being hidden. Further, object manipulators may also be displayed at a constant size, so if the object is very small in the current view, the entire object may often be hidden behind the opaque manipulators.

Figure 19:
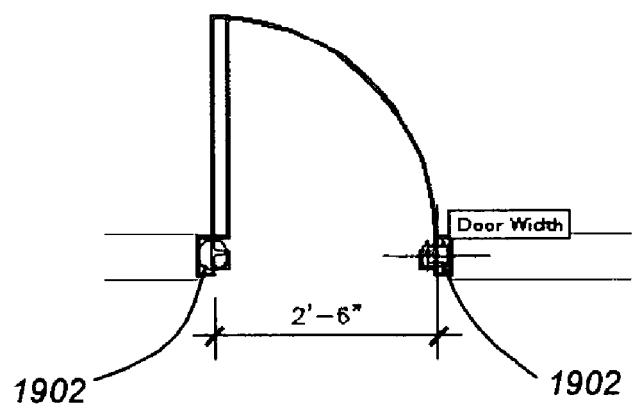
FIG. 19 illustrates a translucent colored object manipulator in accordance with one or more embodiments of the invention.

In one or more embodiments of the invention, object manipulators may be displayed with translucent/transparent colors. Such coloring provides the ability to see the object being manipulated behind the manipulators. FIG. 19 illustrates a translucent colored object manipulator 1902 in accordance with one or more embodiments of the invention. Object manipulators 1902 are translucent so that the door object being manipulated remains visible through the manipulators 1902.

Proximity Dependent Visibility of Object Manipulators

Multiple object manipulators may be defined for the manipulation of a particular object. In the prior art, all of the manipulators are displayed regardless of the current viewing direction of the object. Often, particularly when the object is visually small on the viewing device, two manipulators will overlap each other. Such an overlap of manipulators results in potentially difficult or confusing use or interaction with the manipulators. For example, when a user desires to use a single particular object manipulator on an object with multiple manipulators located confusingly proximate to each other, the user may not know which manipulator the cursor is located over and may not select the desired manipulator.

One or more embodiments of the invention provide a method of controlling the visibility of an object manipulator based on the manipulator's visual proximity to other manipulators present on the object to be manipulated. All manipulators that can be potentially displayed on an object may be identified with a proximity priority. When two manipulators are displayed within a specified proximity, such as the apparent visual size or the active region of the manipulator, the manipulator with the lower priority may not be displayed, thus simplifying the visual display of the manipulators, and by extension simplifying the use and interaction of the manipulators. The active region of a manipulator may be defined as that region relative to the manipulator graphics that activates interaction with the manipulator when the user positions the cursor of a pointing device over the region and activates the pointing device.

Figure 20A:
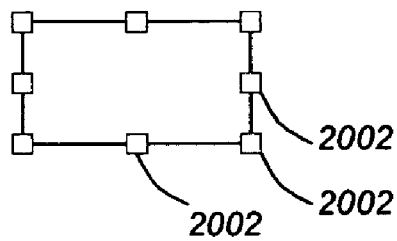
FIGS. 20A–20C illustrate the selective display of object manipulators based on proximity in accordance with one or more embodiments of the invention.
Figure 20B:
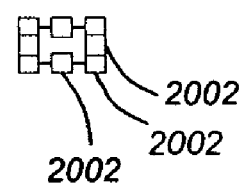
Figure 20C:
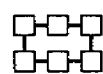

For example, FIG. 20A illustrates a rectangle selected in one view, with object manipulators 2002 displayed on the rectangle's vertices and edges. FIG. 20B shows the same rectangle selected in a different view, which has a different zoom factor, making the rectangle appear visually smaller than it is in the view in FIG. 20A. Since object manipulators are usually displayed with a constant relative size and not scaled with the object being manipulated, the edge manipulators on each side overlap with their corresponding vertex manipulators. If the edge manipulators have a lower proximity priority, and they overlap with other manipulators, they are not displayed, as shown in FIG. 20C.

Visibility of Object Manipulators based on Selection Quantity

As described above, once a number of object manipulators have been defined for a particular object, those manipulators are always displayed on the object when it is selected, regardless of the apparent visual scale of the object and the number of other objects currently selected. Such displaying of all object manipulators often results in an extremely large number of manipulators displayed at the same time, occluding the objects that are selected. In addition, when a large number of objects are selected the user will rarely, if ever, be interested in manipulating single properties of individual objects, but is more interested in accomplishing general operations on all of the selected objects, e.g. moving, copying, or deleting them.

In one or more embodiments of the invention whether or not manipulators are displayed on an object is based on the number of objects selected the first time. If there are currently no objects selected for editing, and the number of objects selected is less than a pre-specified number, object manipulators are displayed, otherwise the object manipulators are not displayed.

For example, suppose the user (or default) specifies a value of two or more selected objects. With such a value, when the user selects one object, all of the object manipulators (or a subset thereof) may be displayed. However, when the user selects additional objects or adds another object to the selected set of objects, the object manipulators are no longer displayed. The lack of displayed manipulators assumes that the user intends to control the objects as a group and does not desire to edit or manipulate the individual objects in the set. The lack of displayed manipulators also minimizes the display to avoid confusing the user.

Logical Flow

Figure 21:
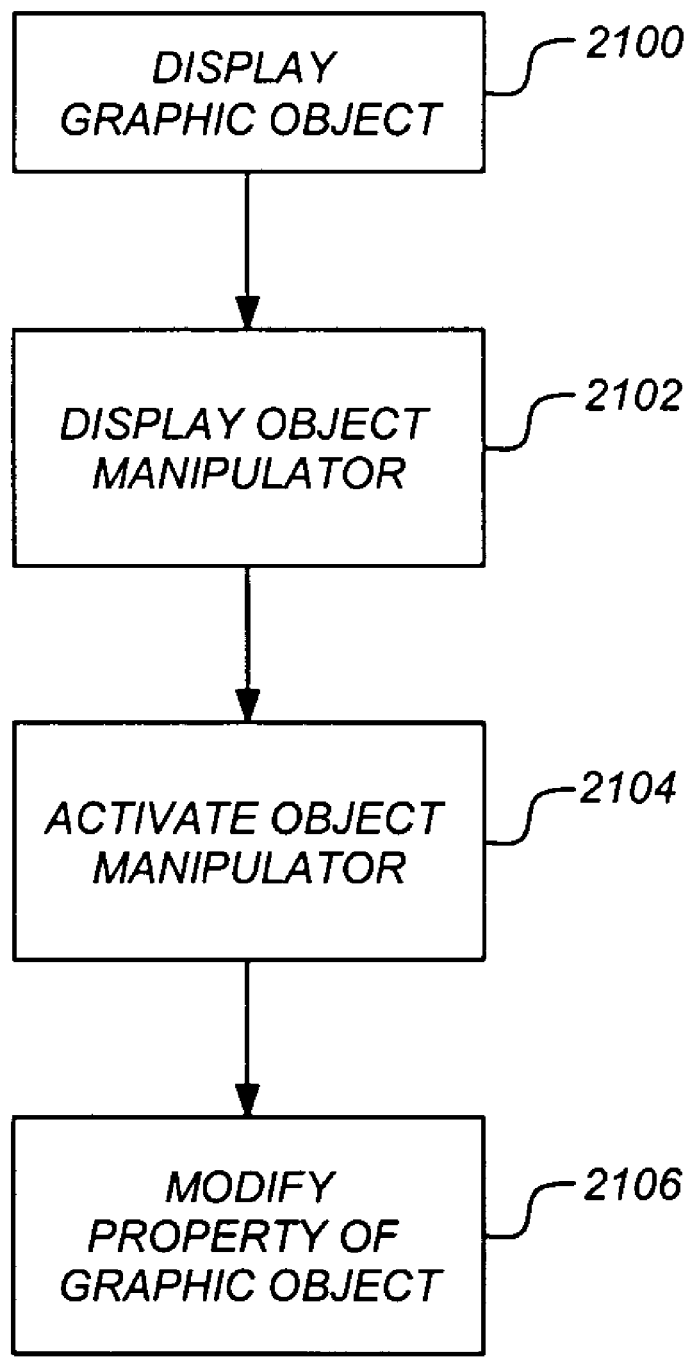
FIG. 21 is a flow chart illustrating the logical flow for using an object manipulator to modify a property of a graphic object in accordance with one or more embodiments of the invention.

As described above, object manipulators (both button and traditional) provide the ability to easily modify one or more properties of an object. FIG. 21 is a flow chart illustrating the logical flow for using an object manipulator to display an object manipulator (button or traditional) and modify a property of a graphic object in accordance with one or more embodiments of the invention.

At step 2100, the graphic object is displayed in a computer graphics program. The graphic object has one or more properties that may control how the graphic object is displayed. For example, properties may establish the color, size, shape, orientation, alignment, etc. of the graphic object.

At step 2102, an object manipulator is displayed on the graphic object. While some embodiments of the invention may utilize button object manipulators, other embodiments may use traditional object manipulators (e.g., that are dragged to edit a property of an object).

In some embodiments, a set of two or more object manipulators may be displayed on the graphic object. Each object manipulator in the set may be used to manipulate the graphic object. Further, the user may easily change the set of object manipulators that are displayed. For example, the user may simply press and release the control key to change the set of object manipulators that are displayed and currently available to the user. Alternatively, the user may use a button object manipulator displayed on the graphic object to change the set of object manipulators. For example, by selecting and activating (e.g., using a cursor control device) the button object manipulator, the currently available manipulator set may be changed. Thus, the user may easily cycle through the available sets of object manipulators. Further, the user may also have the ability to create new sets, and edit or delete existing sets of the object manipulators as desired.

In alternative embodiments, multiple button object manipulators maybe displayed on the graphic object in geometrically meaningful locations. For example, as described above, when language-based descriptions of multiple properties that are associated with multiple button object manipulators are potentially geometrically confusing, the button object manipulators may be located geometrically in a manner to clarify the manipulator's function. For example, the various potential alignment options for the graphic object may be represented by placing various button object manipulators in strategic geometric locations on the graphic object that reflect those alignment options.

In addition to the above, object manipulators may be displayed in one or more colors. Such coloring may indicate whether use of the object manipulator to manipulate the object will affect one or more properties of another object. In yet another embodiment, an object manipulator may be reoriented when an initial orientation is visually confusing or indistinct. Such reorientation may make the object manipulator easier to discern. Alternatively, if the reoriented manipulator is visually confusing or indistinct, the manipulator may not be visible at all.

Object manipulators (both button and traditional) may also be displayed in a variety of different forms or glyphs. Different forms or glyphs may also indicate different functionality. For example, a particular glyph shape may indicate that the graphic object is to be aligned with respect to one or more additional objects. In such an example, a diamond shaped glyph may indicate alignment with a line, circle, or other shape object. The glyph may also be displayed in a translucent color so that the graphic object is visible behind an object manipulator.

At step 2104, the object manipulator is activated. The activation may be invoked by placing a cursor (controlled by a pointing device) over the object manipulator and clicking a button on the pointing device to activate the object manipulator. As described above, the same object manipulator may be used to perform various discrete functions that modify one or more properties of the graphic object. The function that will be performed by a particular object manipulator is represented by the manipulator's function state. Thus, to change the function performed, after activating the object manipulator, the user may modify the object's function state (e.g., by pressing and releasing a control key). Further, so that the user may more easily identify the current function state, a graphic image may be displayed (e.g., at the location of the cursor) that graphically indicates the function state of the object manipulator While object manipulator may often be activated at any time and at a variety of cursor locations, object manipulators may also be constrained to a certain set of values or actions. In this regard, the user may not be permitted to select certain positions when using an object manipulator. Accordingly, after activating an object manipulator, a bitmap image (e.g., a circle with a line through it) may be displayed at the cursor position if selecting the cursor position will result in an error condition when interacting with the manipulator.

At step 2106, the property of the graphic object is modified in response to the activation. With traditional object manipulators, the manipulator may need to be dragged to modify a property of an object. However, if the object manipulator is a button object manipulator, there is no need to drag the button object manipulator to modify the property. In other words, the property is directly modified simply by activating (e.g., selecting with a cursor and pressing a physical button on a cursor control device) the button object manipulator. Alternatively, once the object manipulator (button or traditional) is activated, a discrete number of acceptable property values may be displayed for the user's selection.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for modifying a property of a graphic object in a computer graphics drawing program, comprising:
   a) displaying a graphic object in a computer graphics drawing program, wherein the graphic object comprises one or more graphical elements;
   b) displaying a button object manipulator, comprised of a grip, on the graphic object;
   c) activating the button object manipulate, wherein the activating comprises:
      i. placing a cursor controlled by a pointing device over the button object manipulator; and
      ii. clicking a button on the pointing device to activate the button object manipulator; and
   d) directly modifying a property of the graphic object without dragging the button object manipulator, in response to the activation.

2. The method of claim 1, wherein the property comprises a graphically displayed property of the graphic object.

3. The method of claim 1, wherein:
   the property of the graphic object identifies a set of object manipulators that are displayed on the graphic object and can be used to manipulate the graphic object; and
   the modification of the property changes the set of object manipulators.

4. The method of claim 1, wherein the modifying a property of the graphic object comprises:
   displaying a discrete number of acceptable property values; and
   selecting one or more of the acceptable property values.

5. The method of claim 1, further comprising displaying multiple button object manipulators in geometrically meaningful locations on the graphic object when language-based descriptions of properties associated with the one or note button object manipulator are potentially geometrically confusing.

6. A method for displaying an object manipulator in a computer graphics drawing program comprising:
   displaying a graphic object in a computer graphics drawing program, wherein the graphic object comprises one or more graphical elements;
   displaying an object manipulator, comprised of a grip, on the graphic object in a color, wherein the color of the object manipulator indicates whether activation of the object manipulator will affect one or more properties of another object.

7. A method for displaying an object manipulator in a computer graphics drawing program comprising:
   displaying a graphic object in a computer graphics drawing program, wherein the graphic object comprises one or more graphical elements;
   displaying an object manipulator, comprised of a grip, on the graphic object; and
   reorienting the object manipulator when an initial orientation is visually confusing or indistinct.

8. The method of claim 7, wherein the reoriented object manipulator is not visible when the orientation of the reoriented object manipulator is visually confusing or indistinct.

9. A meted for modifying a property of a graphic object in a computer graphics drawing program, comprising:
   (a) displaying a graphic object in a computer graphics drawing program, wherein the graphic object comprises one or more graphical elements;
   (b) displaying an object manipulator, comprised of a grip, on the graphic object, wherein:
      (i) the object manipulator may be in two or more function states;
      (ii) each function state enables the object manipulator to perform one or more discrete functions that modify one or more properties of the graphic object;
   (c) activating the object manipulator;
   (d) modifying the function state of the object manipulator; and
   (e) modifying one of the properties of the graphic object.

10. The method of claim 9, wherein the function state is modified by pressing and releasing a control key.

11. The method of claim 9, further comprising displaying a graphic image to graphically indicate the function state of the object manipulator.

12. A method for displaying an object manipulator in a computer graphics drawing program, comprising:
- displaying a graphic object in a computer graphics drawing program, wherein the graphic object comprises one or more graphical elements;
- displaying an object manipulator, comprised of a grip, on the graphic object;
- activating the object manipulator; and
- displaying a bitmap image at a cursor position if selecting the cursor position will result in an error condition when interacting with the object manipulator.

13. A method for modifying a property of a graphic object in a computer graphics drawing program, comprising:
- displaying a graphic object in a computer graphics drawing program, wherein the graphic object comprises one or more graphical elements;
- displaying an object manipulator, comprised of a grip, on the graphic object wherein a particular glyph shape of the object manipulator indicates an alignment of the graphic object with respect to one or more additional objects;
- activating the object manipulator; and
- modifying a property of the graphic object in response to the activation.

14. A method for displaying an object manipulator in a computer graphics drawing program, comprising:
- displaying a graphic object in a computer graphics drawing program, wherein the graphic object comprises one or more graphical elements;
- displaying an object manipulator, comprised of a grip, on the graphic object wherein the object manipulator is displayed in a translucent color, such that the graphic object is visible behind the object manipulator.

15. An apparatus for modifying a property of a graphic object in a computer graphics drawing program of a computer system comprising:
a) a computer having memory;
b) an application executing on the computer, wherein the application is configured to:
   i. display a graphic object in a computer graphics drawing program, wherein the graphic object comprises one or more graphical elements;
   ii. display a button object manipulator, comprised of a grip, on the graphic object;
   iii. activate the button object manipulator by:
      1. placing a cursor controlled by a pointing device over the button object manipulator; and
      2. clicking a button on the pointing device to activate the button object manipulator ; and
   iv. directly modifying a property of the graphic object without dragging the button object manipulator, in response to the activation.

16. The apparatus of claim 15, wherein the property comprises a graphically displayed property ot the graphic object.

17. The apparatus of claim 15, wherein: the property of the graphic object identifies a set of object manipulators that are displayed on the graphic object and can be used to manipulate the graphic object, and
the modification of the property changes the set of object manipulators.

18. The apparatus of claim 15, wherein the application is configured to modify a property of the graphic object by:
- displaying a discrete number of acceptable property values; and
- selecting one or more of the acceptable property values.

19. The apparatus of claim 15, wherein the application is further configured to display multiple button object manipulators in geometrically meaningful locations on the graphic object when language-based descriptions of properties associated with the one or more button object manipulator are potentially geometrically confusing.

20. An apparatus for displaying an object manipulator in a computer graphics drawing program of a computer system comprising:
(a) a computer having a memory;
(b) an application executing on the computer, wherein the application is configured to:
   (i) display a graphic object in a computer graphics drawing program, wherein the graphic object comprises one or mote graphical elements; and
   (ii) display an object manipulator, comprised of a grip, on the graphic object in a color, wherein the color of the object manipulator indicates whether activation of the object manipulator will affect one or more properties of another object.

21. An apparatus for displaying an object manipulator in a computer graphics drawing program of a computer system comprising:
(a) a computer having a memory;
(b) an application executing on the computer, wherein the application is configured to:
   (i) display a graphic object in a computer graphics drawing program, wherein the graphic object comprises one or more graphical elements; and
   (ii) display an object manipulator, comprised of a grip, on the graphic object; and
   (iii) reorient the object manipulator when an initial orientation is visually confusing or indistinct.

22. The apparatus of claim 21, wherein the reoriented object manipulator is not visible when the orientation of the reoriented object manipulator is visually confusing or indistinct.

23. An apparatus for modifying a property of a graphic object in a computer graphics drawing program of a computer system comprising:
(a) a computer having a memory;
(b) an application executing on the computer, wherein the application is configured to:
   (i) display a graphic object in a computer graphics drawing program, wherein the graphic object comprises one or more graphical elements;
   (ii) display an object manipulator, comprised of a grip, on the graphic object, wherein:
      (1) the object manipulator may be in two or more function stares; and
      (2) each function state enables the object manipulator to perform one or mare discrete functions that modify one or more properties of the graphic object;
   (iii) activate the object manipulator;
   (iv) modify the function state of the object manipulator; and
   (v) modify a property of the graphic object.

24. The apparatus of claim 23, wherein the function stare is modified by pressing and releasing a control key.

25. The apparatus of claim 23, wherein the application is further configured to display a graphic image to graphically indicate the function state of the object manipulator.

26. An apparatus for displaying an object manipulator in a computer graphics drawing program of a computer system comprising:
(a) a computer having a memory;

(b) an application executing on the computer, wherein the application is configured to:
(i) display a graphic object in a computer graphics drawing program, wherein the graphic object comprises one or more graphical elements;
(ii) display an object manipulator, comprised of a grip, on the graphic object;
(iii) activate the object manipulator; and
(iv) display a bitmap image at a cursor position if selecting the cursor position will result in an error condition when interacting with the object manipulator.

27. An apparatus for modifying a property of a graphic object in a computer graphics drawing program of a computer system comprising:
(a) a computer having a memory;
(b) an application executing on the computer, wherein the application is configured to:
(i) display a graphic object in a computer graphics drawing program, wherein the graphic object comprises one or more graphical elements;
(ii) display an object manipulator, comprised of a grip, on the graphic object wherein a particular glyph shape of the object manipulator indicates an alignment of the graphic object with respect to one or mote additional objects;
(iii) activate the object manipulator; and
(iv) modify a property of the graphic object in response to the activation.

28. An apparatus for displaying an object manipulator in a computer graphics drawing program of a computer system comprising:
(a) a computer having a memory;
(b) an application executing on the computer, wherein the application is configured to:
(i) display a graphic object in a computer graphics drawing program, wherein to the graphic object comprises one or more graphical elements; and
(ii) display an object manipulator, comprised of a grip, on the graphic object in a translucent color, such that the graphic object is visible behind the object manipulator.

29. An article of manufacture comprising a program storage medium readable by a computer and embodying one or more instructions executable by the computer to perform a method for modifying a property of a graphic object in an object-oriented computer graphics drawing system, the method comprising:
a) means for displaying a graphic object in a computer graphics drawing program, wherein the graphic object comprises one or more graphical elements;
b) means for displaying a button object manipulator, comprised of a grip, on the graphic object;
c) means for activating the button object manipulator, wherein the means for activating comprises:
i. means for placing a cursor controlled by a pointing device over the button object manipulator; and
ii. means for clicking a button on the pointing device to activate the button object manipulator ;and
d) means for directly modifying a property of the graphic object without dragging the button object manipulator, in response to the activation.

30. The article of manufacture of claim 29, wherein the property comprises a graphically displayed property of the graphic object.

31. The article of manufacture of claim 29, wherein:
the property of the graphic object identifies a set of object manipulators that are displayed on the graphic object and can be used to manipulate the graphic object; and
the modification of the property changes the set of object manipulators.

32. The article of manufacture of claim 29, wherein the means for modifying a property of the graphic object comprises:
means for displaying a discrete number of acceptable property values; and
means for selecting one or more of the acceptable property values.

33. The article of manufacture of claim 29, further comprising means for displaying multiple button object manipulators in geometrically meaningful locations on the graphic object when language-based descriptions of properties associated with the one or more button object manipulator are potentially geometrically confusing.

34. An article of manufacture comprising a program storage medium readable by a computer and embodying one or more instructions executable by the computer to perform a method for displaying an object manipulator in an object-oriented computer graphics drawing system, the method comprising:
means for displaying a graphic object in a computer graphics drawing program, wherein the graphic object comprises one or more graphical elements;
means for displaying an object manipulator, comprised of a grip, on the graphic object in a color, wherein the color of the object manipulator indicates whether activation of the object manipulator will affect one or more properties of another object.

35. An article of manufacture comprising a program storage medium readable by a computer and embodying one or more instructions execurable by the computer to perform a method for displaying an object manipulator in an object-oriented computer graphics drawing system, the method comprising:
means for displaying a graphic object in a computer graphics drawing program, wherein the graphic object comprises one or more graphical elements;
means for displaying an object manipulator, comprised of a grip, on the graphic object;
means for reorienting the object manipulator when an initial orientation is visually confusing or indistinct.

36. The article of manufacture of claim 35, wherein the reoriented object manipulator is not visible when the orientation of the reoriented object manipulator is visually confusing or indistinct.

37. An article of manufacture comprising a program storage medium readable by a computer and embodying one or more instructions executable by the computer to perform a method for modifying a property of a graphic object in an object-oriented computer graphics drawing system, the method comprising:
(a) means for displaying a graphic object in a computer graphics drawing program, wherein the graphic object comprises one or more graphical elements;
(b) means for displaying an object manipulator, comprised of a grip, on the graphic object, wherein:
(i) the object manipulator may be in two or more function states;
(ii) each function state enables the object manipulator to perform one or more discrete functions that modify one or more properties of the graphic object;
(c) means for activating the object manipulator;

(d) means for modifying the function state of the object manipulator; and (e) means for modifying a property of the graphic object.

38. The article of manufacture of claim 37, wherein the function state is modified by pressing and releasing a control key.

39. The article of manufacture of claim 37, further comprising means for displaying a graphic image to graphically indicate the function state of the object manipulator.

40. An article of manufacture comprising a program storage medium readable by a computer and embodying one or more instructions executable by the computer to perform a method for displaying an object manipulator in an object-oriented computer graphics drawing system, the method comprising:

means for displaying a graphic object in a computer graphics drawing program, wherein the graphic object comprises one or more graphical elements;

means for displaying an object manipulator, comprised of a grip, on the graphic object;

means for activating the object manipulator; and means for displaying a bitmap image at a cursor position if selecting the cursor position will result in an error condition when intertacting with the object manipulator.

41. An article of manufacture comprising a program storage medium readable by a computer and embodying one or more instructions executable by the computer to perform a method for displaying an object manipulator in an object-oriented computer graphics drawing system, the method comprising:

means for displaying a graphic object in a computer graphics drawing program, wherein the graphic object comprises one or more graphical elements;

means for displaying an object manipulator, comprised of a grip, on the graphic object, a particular glyph shape of the object manipulator indicates an alignment of the graphic object with respect to one or more additional objects.

42. An article of manufacture comprising a program storage medium readable by a computer arid embodying one or more instructions executable by the computer to perform a method for displaying an object manipulator in an object-oriented computer graphics drawing system, the method comprising:

means for displaying a graphic object in a computer graphics drawing program, wherein the graphic object comprises one or more graphical elements;

means for displaying an object manipulator, comprised of a grip, on the graphic object, wherein the object manipulator is displayed in a translucent color, so the graphic object is visible behind the object manipulator.

* * * * *

UNITED STATES PATENT AND TRADEMARK OFFICE
CERTIFICATE OF CORRECTION

PATENT NO. : 7,110,005 B2  Page 1 of 1
APPLICATION NO. : 10/657422
DATED : September 19, 2006
INVENTOR(S) : Scott Anthony Arvin et al.

It is certified that error appears in the above-identified patent and that said Letters Patent is hereby corrected as shown below:

In the Claims

Column 16, line 20, Claim 5, please delete the word "note" and replace with the word --more--.

Column 18, line 15, Claim 20, please delete the word "mote" and replace with the word --more--.

Column 18, line 50, Claim 23, please delete the word "stares" and replace with the word --states--.

Column 18, line 59, Claim 24, please delete the word "stare" and replace with the word --state--.

Column 19, line 27, Claim 27, please delete the word "mote" and replace with the word --more--.

Column 20, line 36, Claim 35, please delete the word "execurable" and replace with the word --executable--.

Signed and Sealed this
Twentieth Day of May, 2014

Michelle K. Lee
*Deputy Director of the United States Patent and Trademark Office*